S. FRIEND.
ANIMAL-TRAP.
No. 186,671. Patented Jan. 30, 1877.
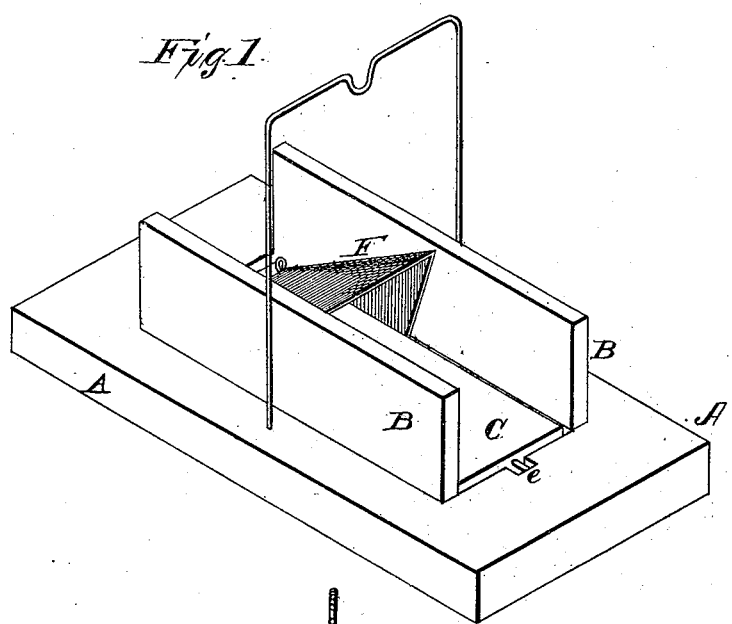
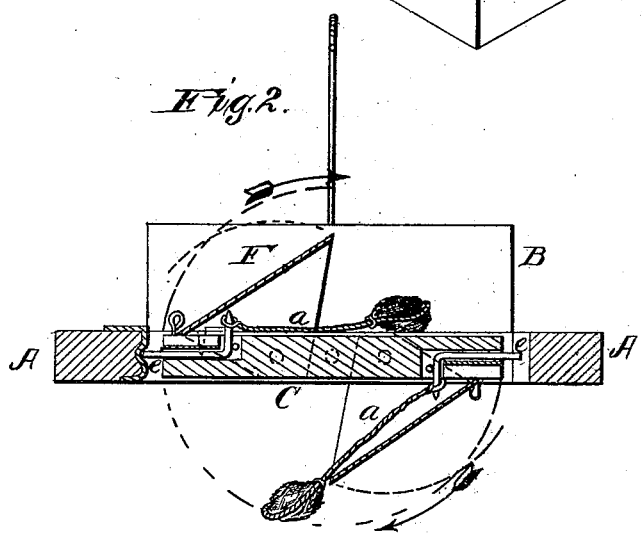
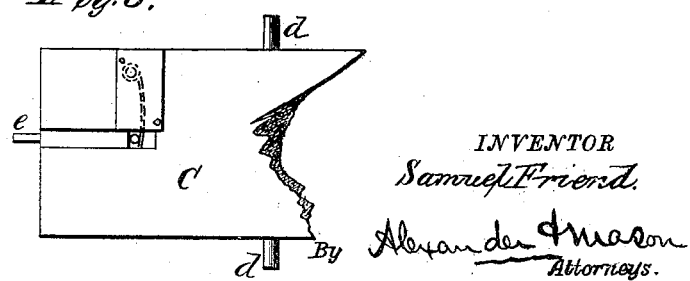
WITNESSES
Franck L. Ouraud
C. L. Evert
INVENTOR
Samuel Friend.
By Alexander Mason
Attorneys.

UNITED STATES PATENT OFFICE.

SAMUEL FRIEND, OF DECATUR, ILLINOIS.

IMPROVEMENT IN ANIMAL-TRAPS.

Specification forming part of Letters Patent No. 186,671, dated January 30, 1877; application filed July 12, 1876.

*To all whom it may concern:*

Be it known that I, SAMUEL FRIEND, of Decatur, in the county of Macon and in the State of Illinois, have invented certain new and useful Improvements in Self-Setting Animal-Traps; and do hereby declare that the following is a full, clear, and exact description thereof, reference being had to the accompanying drawings, and to the letters of reference marked theron, making a part of this specification.

My invention consists in the construction and arrangement of certain devices in an animal-trap, whereby it is made to work automatically, as will be hereinafter more particularly set forth.

In the accompanying drawings, A represents a platform, of sufficient size to suit the kind of trap required. Through this platform is cut an opening to receive the revolving door C. B B represent walls upon each side of the door. The door C is provided with trunnions $d\ d$ at its center, and these trunnions have their bearings in the platform A. F F represent metallic bonnets upon the door, one being upon the upper side, and the other upon the lower side, of the door, and at opposite ends. Passing through the door at each end are spring-bolts $e\ e$, which, acting as triggers, fasten and unfasten the door. To these bolts are secured short cords $a\ a$, and to the cords the bait is secured.

After passing onto the door, the animal endeavors to take the bait from the string, and by pulling at it the bolt diseugages the door, so that it will immediately revolve by the weight of the animal, and carry it beneath into any receptacle placed to receive it. The door makes a half revolution, and the impetus given it by the falling animal causes it to automatically set itself again.

The bonnet, which is in triangular form, as seen, protects the bait, prevents the animal from approaching it in any but the proper direction, and assists in preventing his escape when the door revolves.

This trap can be used over a barrel, or bucket, or box, or pit, or any hole or receptacle where the animal will be retained after having been caught.

Having thus fully described my invention, what I claim is—

The combination of the platform A, provided with side walls B B, the centrally-pivoted door C, with an L-shaped spring-bolt, $e$, at each end, the cords $a\ a$, and the bonnets F F, all constructed substantially as and for the purposes herein set forth.

In testimony that I claim the foregoing I have hereunto set my hand this 21st day of June, 1876.

SAMUEL FRIEND.

Witnesses:
W. A. ALBERT,
THEO. COLEMAN.